United States Patent [19]

Blanc et al.

[11] 4,407,784

[45] Oct. 4, 1983

[54] PROCESS FOR THE SELECTIVE EXTRACTION TREATMENT OF GASEOUS HYDROCARBON MIXTURE CONTAINING CARBON DIOXIDE

[75] Inventors: Claude Blanc, Pau; Henry Galy, Bordes; Jean Elgue, Viellesegure, all of France

[73] Assignee: Societe Nationale Elf Aquitaine (Production), Courbevoie, France

[21] Appl. No.: 312,646

[22] Filed: Oct. 19, 1981

Related U.S. Application Data

[63] Continuation of Ser. No. 230,518, Feb. 2, 1981, abandoned, which is a continuation-in-part of Ser. No. 168,797, Jul. 11, 1980, abandoned, which is a continuation of Ser. No. 87,889, Oct. 24, 1979, abandoned.

[30] Foreign Application Priority Data

Oct. 27, 1978 [FR] France .................. 78 30639

[51] Int. Cl.³ ............................................. B01D 53/34
[52] U.S. Cl. ..................................... 423/228; 423/229
[58] Field of Search ................................. 423/226–228

[56] References Cited

U.S. PATENT DOCUMENTS

| | | | |
|---|---|---|---|
| 3,489,506 | 1/1970 | Galstaun et al. | 423/233 |
| 3,622,267 | 11/1971 | Bartholome et al. | 423/229 |
| 4,085,192 | 4/1978 | Van Scoy | 423/228 |
| 4,297,329 | 10/1981 | Sigmund et al. | 423/228 |

Primary Examiner—Earl C. Thomas

[57] ABSTRACT

The present invention relates to a process for the selective extraction treatment of a gaseous hydrocarbon mixture containing 5 to 3000 ppm (parts per million) by volume of hydrogen sulfide and 0.3 to 3% carbon dioxide, in order to obtain a purified gas containing less than 4 ppm by volume hydrogen sulfide and less than 2% carbon dioxide.

The gaseous hydrocarbon mixture is submitted to a series of counter-current washings by contact with a tertiary amine aqueous solution in an absorption zone from which is drawn a liquid effluent enriched in hydrogen sulfide.

5 Claims, 1 Drawing Figure

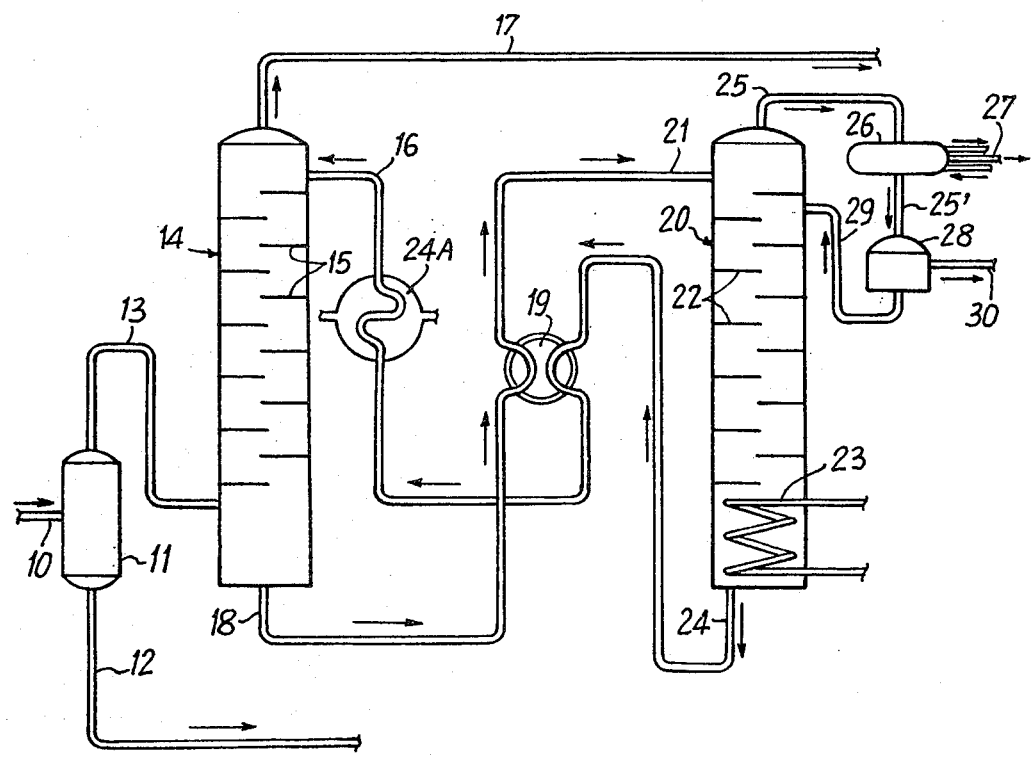

PROCESS FOR THE SELECTIVE EXTRACTION TREATMENT OF GASEOUS HYDROCARBON MIXTURE CONTAINING CARBON DIOXIDE

RELATED APPLICATIONS

This application is a continuation of application Ser. No. 230,518, filed Feb. 2, 1981, now abandoned, which is a continuation-in-part of application Ser. No. 168,797, filed July 11, 1980, now abandoned, which in turn is a continuation of application Ser. No. 087,889, filed Oct. 24, 1979 and now abandoned.

The present invention relates to a process for the selective extraction treatment of a gaseous hydrocarbon mixture containing 5 to 3000 ppm (parts per million) by volume of hydrogen sulphide and 0.3 to 3% carbon dioxide, in order to obtain a purified gas containing less than 4 ppm by volume hydrogen sulphide and less than 2% carbon dioxide.

The present invention is aimed at solving the problem raised by the use in distribution networks of natural gases containing more hydrogen sulphide than the level required and having a carbon dioxide content lower than or equal to the standard requirements. It is also its aim to allow the use of natural gases which have to be purified as to their content of hydrogen sulfide while keeping a carbon dioxide content sufficient for the gas to present a calorific power close to the calorific power of a gas having another origin already used in the same distribution network. The aim of the invention is also to allow the use of gases already purified as to their hydrogen sulfide content and having a content of carbon dioxide within acceptable limits, which have been stored underground; in fact, it is known that such stocked gas, when used, contains generally a content of hydrogen sulfide comprised between 5 and 3000 ppm, which is of a higher content than the gas originally stored since it has been enriched in hydrogen sulfide during the period of storage by contact with the porous and permeable rocks constituting the natural reservoir.

It has been envisaged to treat certain of these gases by known processes which are based on the principle of total absorption of both hydrogen sulfide and carbon dioxide by amines such as monoethanolamine (MEA) or diethanolamine (DEA). These processes, however, require the use of a liquid flow-rate much higher than that which the process according to the present invention requires and, that they thus lead to the over-dimensioning of the amine regenerating column and to a proportionally increased consumption of reboiler steam, which result in heavier investments and higher power consumption per metric cube of gas.

The process according to the present invention allows these drawbacks to be overcome by treating the gaseous hydrocarbon mixture with a solvent which, in the process conditions, selectively retains the hydrogen sulfide and maintains the carbon dioxide content at a little lower proportion than 2% while necessitating a solvent flow-rate substantially lower than in the process in which all the impurities are removed.

In a process according to the present invention, a hydrocarbon gaseous mixture, under a pressure between 80 and 90 bars, containing 5 to 3000 ppm by volume hydrogen sulfide and 0.3 to 3% carbon dioxide, is submitted to a selective extraction treatment in order to reduce the hydrogen sulfide content to less than 4 ppm while keeping the carbon dioxide content under 2%, such treatment comprising contacting the gaseous hydrocarbon mixture with a tertiary amine aqueous solution in an absorption column having from 3 to 18 perforated contacting trays, each tray having a ratio of perforated surface to total surface ranging from 2 to 10%, while maintaining a height of liquid on each tray from about 2 to about 6 centimeters, withdrawing a liquid effluent enriched in hydrogen sulfide from the absorption column and passing said liquid effluent to a regeneration zone, submitting the liquid effluent in the regeneration zone to a heat treatment at a temperature and a pressure such that a regenerated aqueous amine solution with a H$_2$S content less than 1 g per liter is formed, and returning said regenerated amine solution from the regeneration zone to the absorption column.

In a preferred embodiment, the tertiary amine used is methyldiethanolamine, in short MDEA. As is known in the prior art, the tertiary amines are selective in the extraction of hydrogen sulfide with respect to the carbon dioxide, the selectivity being of a cinetic nature. In this case, the hydrogen sulfide reacts rapidly with amine in order to neutralize it. The carbon dioxide which reacts directly with the primary and secondary amines cannot react directly with tertiary amine. They must first of all react with water to form carbonic acid according to the reaction (1)

$$CO_2 + H_2O \rightleftharpoons CO_3H_2 \tag{1}$$

or react with the OH ions present in the aqueous medium according to reaction (2):

$$CO_2 + OH^- \rightleftharpoons CO_3H^- \tag{2}$$

It is then necessary that the carbonic acid or the CO$_3$H$^-$ ion reacts with the amine according to an acid-base reaction in order to neutralize the amine. Since the reaction rate of reaction (1) and (2) are low compared to the neutralization rate of the amine by hydrogen sulfide, it is possible in a suitably dimensioned absorber to remove the hydrogen sulfide almost completely while leaving a large proportion of the carbon dioxide in the hydrocarbon gas. However, since the rate of reactions (1) and (2) depend on the partial pressure of the carbon dioxide in the feed gas, it is necessary to proceed to a specific definition of the flow-rate of the liquid and the number of washing steps or plates in order that, from a gas having a given composition of hydrogen sulfide and carbon dioxide, is achieved an almost total purification of hydrogen sulfide while limiting the carbon dioxide absorption. If the number of washing steps is too small, it will be necessary to decrease progressively the liquid flow-rate in order to achieve the desired purification. If the opposite happens, i.e. if the number of washing steps is too high, it is thus observed that the carbon dioxide absorption is raised. There is thus a certain liquid flow-rate level and washing steps number which is particularly appropriate to the process although varying with the feed composition in hydrogen sulfide and carbon dioxide as well as with the contents of these two components required in the purified gas.

The concentration of the amine solution may vary within wide limits. In general, a concentration comprised between 20 and 50% by weight with respect to the following solution is used since, when said concentration is used at a concentration:

lower than 20%, it is necessary to increase considerably the liquid flow-rate;
above 50%, the viscosity increases considerably.

One of the characteristics of the process is to push the amine regeneration so that the amine returned at the top of the washing column contains less than 0.5 g hydrogen sulfide per liter. Several methods can be used to reach the said result; they specifically depend on the quantities of hydrogen sulfide and carbon dioxide contained in the amine solution when it leaves the washing column and, among others, of the reboiling temperature, the pressure at the top of the regeneration column, the ratio of the number of moles of water leaving the regeneration column to the number of moles of hydrogen sulfide dissolved, the number of trays of the regenerator and the entrance temperature of the amine in the regenerator may be cited.

The invention will be better understood in the light of the comments relating to the drawing, given by way of example but without limiting the scope of the invention; the drawing represents a flow sheet of an industrial installation for the treatment of gas according to the present invention.

In reference to this drawing, a feeding conduit 10 leads the hydrocarbon gas to be treated to a separator 11 from which a conduit 12 draws off the condensates and a conduit 13 carries along the gaseous phase to the lower part of a contacting column 14, the said column 14 containing a series of contacting trays such as 15.

The contacting column for contacting a gas by a liquid may contain any suitable disposition of trays, baffles and packings, according to needs, in order to achieve the best contact between the liquid and the gas.

A conduit 16 issuing into the top part of column 14 is connected to a solution feed means.

At the top of contacting column 14 an evacuation conduit 17 leads off the gaseous phase while at the bottom of said contacting column an evacuation conduit 18 draws off the liquid phase.

The conduit 18, after passing through an exchanger 19, is prolonged by a conduit 21 which enters at the upper part of a regeneration column 20 containing a series of trays 22.

The regeneration column 20 comprises in its lower part a boiler 23 normally constituted by a tubular exchanger connected to a steam source, not represented.

From the lower part of the regeneration column 20 exits a conduit 24 which, after passing through exchanger 19 is prolonged by conduit 16 which issues into the upper part of column 14 after passage through refrigerator 24A.

From the upper part of the regeneration column 20 exits a conduit 25 leading to a condensor 26. From the condensor exits an upper conduit 27 for the gaseous effluent and a lower conduit 25' for the condensate. The conduit 25' leads to a tank 28 from which exit two conduits, namely a lower conduit 29 leading to the upper part of the regeneration column 20 and an upper discharge conduit 30.

The operating of such an installation is as follows: the natural gas containing hydrogen sulfide and carbon dioxide is treated by entering it through conduit 10 in a primary separator 11 in which is removed from the natural gas a certain quantity of water and heavy hydrocarbon compounds. The natural hydrocarbon gas leaves the top of the separator through conduit 13 and penetrates in the lower section of a countercurrent contacting column 14 containing a series of trays 15.

The aim of this arrangement is to achieve a close contact between the liquid and the gas and therefore the said column can contain any favorable elements therefore such as among others, trays, baffles, packings, and so on.

The amine solution is introduced in the upper part of the contacting column 14 through conduit 16. The purified natural gas leaves the top of column 14 through conduit 17. At this stage it satisfies the standard requirement and can be, after drying, used directly.

The enriched amine solution, exitting the contacting column 14 through conduit 18 is treated while passing through exchanger 19 before penetrating a regeneration column 20 through conduit 21. The regenerator contains a series of trays 22 and comprises at its lower part a boiler 23 in which circulates steam in order to allow the regeneration of the amine solution. The hot regenerated amine solution leaves the bottom of regenerator 20 through conduit 24; it is then cooled in exchanger 19 and in refrigerator 24A before being recycled in column 14 through conduit 16. The acid gases leave the regenerator by conduit 25 and are led to condensor 26. The water and amine separated in condensor 26 are retrapped in tank 28 which acts as an accumulator and then recycled in the regenerator in order to limit water and amine losses. In order to simplify the description and drawing the elements such as pumps, valves, tanks, etc, the use of which is obvious to the specialist, are not represented.

The following examples, given by way of illustration without in any way limiting the same, illustrate the operating conditions and the compositions of the different liquid and gaseous effluents obtained on the units using the process according to the invention.

EXAMPLE 1

A gaseous hydrocarbon mixture, formed mainly of methane and containing 0.7% $CO_2$, 11 ppm $H_2S$ enters the primary separator under a total pressure of 80 bars, the flow-rate being 50 000 $Nm^3/H$. This gas is washed in the column 14 such as described above by counter-current contact with a methyldiethanolamine (MDEA) solution having a concentration of 3 moles of MDEA per liter (36% by weight) Said MDEA solution, which is entered at the top of the washing column 14, has been submitted to a regeneration treatment, by reboiling with steam at a temperature of 100° to 130° C., in order that its hydrogen sulfide content be less than 0.5 per liter. The flow-rate of the aqueous amine solution is 2 $m3/H$. The absorption column 20 is in this case provided with 9 perforated trays, whose percentage of the perforated area to the total area is 5% and whose heigh of the overflow over the tray is of 3 cm, the temperature being maintained near 20° C.

EXAMPLE 2

In this case the gas to be purified is fed at a flow-rate of 25,000 $m3/H$. It arrives at the primary separator at a pressure of 60 bars. It is essentially formed of methane and contains, however, 1.6% carbon dioxide and 35 ppm hydrogen sulfide. It is washed by a counter-current aqueous solution in a tower comprising 7 perforated trays. These trays have a percentage of perforated area to the total area of 8%. The heigh of the overflow over the tray is of 5 cm. The aqueous solution is a solution of MDEA with 3.4 moles by liter with a flow-rate of 1.5 $m3/H$, injected at the top of the absorber a temperature of 30° C. In these conditions, the purified gas obtained contains 2.5 ppm hydrogen sulfide and 1.4% carbon dioxide.

What is claimed is:

1. A process for the treatment of a gaseous hydrocarbon mixture at a pressure from 20 to 90 bars, which mixture contains 5 to 3,000 ppm by volume of hydrogen sulfide and 0,3 to 3% carbon dioxide, in order to reduce the hydrogen sulfide content to less than 4 ppm and to limit the carbon dioxide content to 2%, wherein:

submitting the hydrocarbon mixture to a series of from 3 to 18 counter-current washings by contact with an aqueous solution of methyldiethanolamine having a concentration of 20 to 50% by weight to obtain a liquid effluent enriched in hydrogen sulfide, submitting the enriched effluent to a regeneration treatment in a regeneration zone at a temperature and pressure to cause the liquid effluent to boil to form a regenerated amine solution having a hydrogen sulfide content of less than 1 g/L, and returning the thus generated amine solution to the upstream end of the absorption zone, and maintaining the flow rates of the gaseous mixture and amine solution fed to the absorption zone at such values that the ratio of the flow rate of gaseous mixture to the flow rate of the amine solution is from $16 \times 10^3$ to $25 \times 10^3$, where said flow rates are expressed in the same units.

2. A process according to claim 1 in which the regenerated amine solution fed to the absorption zone contains less than 0.5 g/L of hydrogen sulfide.

3. A process for the selective extraction treatment of a gaseous hydrocarbon mixture at a pressure between 20 and 90 bars, containing 5 to 3,000 ppm by volume hydrogen sulfide and 0.3 to 3% carbon dioxide, in order to reduce the hydrogen sulfide content to less than 4 ppm and to keep the carbon dioxide content limited to 2%, which comprises:

(a) contacting the gaseous hydrocarbon mixture with a tertiary amine aqueous solution in an absorption column having from 3 to 18 perforated contacting trays, each tray having a ratio of perforated surface to total surface ranging from 2 to 10%, while maintaining a height of liquid on each tray from about 2 to about 6 centimeters, (b) withdrawing the liquid effluent enriched in hydrogen sulfide from the absorption column and passing said liquid effluent to a regeneration zone, (c) submitting the liquid effluent in the regeneration zone to a heat treatment at a temperature and a pressure such that a regenerated aqueous amine solution with a $H_2S$ content less than 1 g per liter is formed, (d) returning said regenerated amine solution from the regeneration zone to the absorption column, and (e) maintaining the flow rates of the gaseous hydrocarbon mixture and tertiary amine aqueous solution fed to the absorption column at such values that the ratio of the flow rate of gaseous hydrocarbon mixture to the flow rate of the tertiary amine aqueous solution is from $16 \times 10^3$ to $25 \times 10^3$, where said flow rates are expressed in the same units.

4. A process according to claim 3, wherein the generated tertiary amine aqueous solution fed to the absorption column contains less than 0.5 g/L of hydrogen sulfide.

5. A process according to claim 3, wherein an aqueous solution of methyldiethanolamine having an amine concentration of 20 to 50% by weight is used as the aqueous tertiary amine solution.

* * * * *